This invention relates to an improved method for the preparation of rubber-modified polystyrene resins, and more particularly, to the use of inert diluents and critical conditions for the bulk copolymerization of vinyl aromatic compounds and rubbery materials to produce rubber-modified polymers having outstanding impact, flow, tensile and surface properties. The improvements in the process further permit the copolymerization to be carried out with greatly increased control and uniformity of the reaction and of the products obtained thereby.

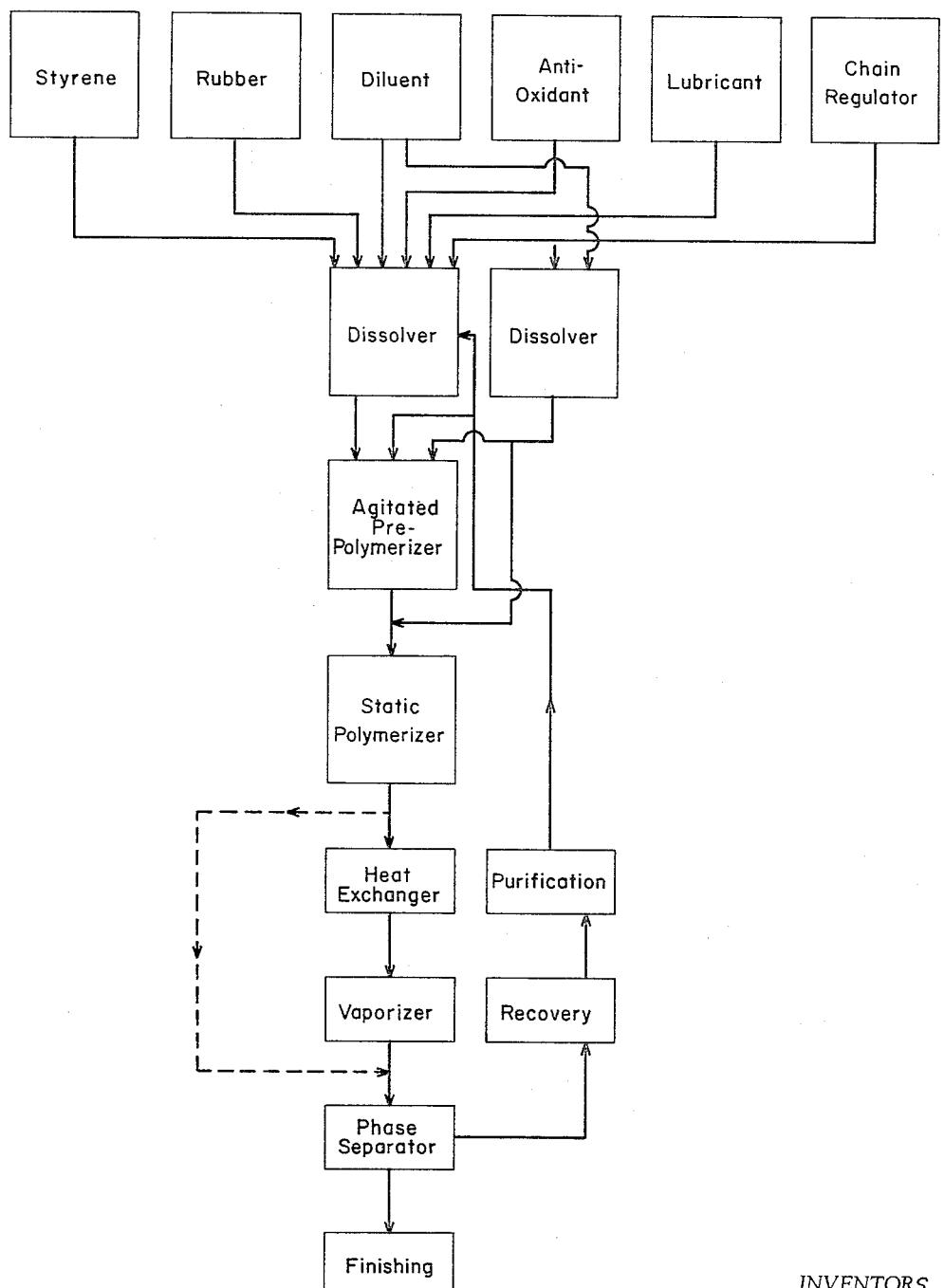
INVENTORS
KENNETH W. DOAK
MICHAEL ERCHAK, JR.
BARNA TOEKES
BY Fred S. Valles 3,311,675
BULK SOLVENT POLYMERIZATION PROCESS
Kenneth W. Doak, Wyckoff, Michael Erchak, Jr., Ridgewood, and Barna Toekes, Oakland, N.J., assignors to Rexall Drug and Chemical Company, Los Angeles, Calif., a corporation of Delaware
Filed Apr. 16, 1963, Ser. No. 273,451
14 Claims. (Cl. 260—880)

It has been known in the art to prepare rubber-modified polymers of vinyl aromatic polymers such as styrene, methyl styrenes, and the like, with vulcanizable, i.e. unsaturated rubbery materials. There are a number of well-known commercial processes for carrying out these polymerizations. These include processes such as bulk (or mass), emulsion and suspension polymerization. This invention is concerned with improvements in the bulk polymerization method.

Polymerization reactions such as those involving vinyl aromatic monomers and rubbery components are highly exothermic and the polymeric mixtures are very poor conductors of heat. Temperature control thus becomes increasingly difficult during the course of the polymerization. One reason for this is that as the polymerization reaction progresses, the mixture becomes very viscous and sticky and cannot be agitated efficiently to disperse the heat of reaction. Thus, control of the reaction temperature to obtain a polymeric product having desired chemical and physical properties, together with control of the reaction to obtain commercially satisfactory rates of production, becomes very difficult and expensive. These difficulties increase and are greatly magnified when large commercial quantities of materials are being reacted. In addition to this, the rubbery material and the vinyl aromatic monomer, during initial polymerization, tend to interact to give cross-linked and grafted materials if this step is not adequately controlled. This results in undesired and detrimental gels and non-homogeneous products. Excessive mechanical working may be required to blend the polymers into a homogeneous composition and this may seriously damage some important physical properties of the resin. Thus, the product may exhibit inferior tensile and impact properties and therefore it might no longer be suitable for extrusion or injection molding purposes because of breakdown of the microscopic structures.

Increasing temperatures of the polymerization to obtain faster reaction rates and thereby a more economical process, is not usually successful, since overheating of the mass may result in discoloration of the polymeric products and may, in fact, cause an extremely vigorous, exothermic reaction resulting in a breakdown of molecular structures.

An object of this invention is to provide a process for polymerizing monovinyl aromatic monomers with rubbery components which results in high impact resin products of improved physical properties.

Another object is to improve the physical properties of rubber-modified polyvinyl aromatic resins, and more particularly, to improve the properties of rubber-modified polystyrene.

Still another object is to improve the impact strength, melt flow, tensile and surface properties of rubber-modified polystyrene.

A still further object is to provide a method for regulating and controlling the polymerization reaction and the properties of the resin resulting therefrom by polymerizing a monovinyl aromatic monomer and a rubbery material under controlled conditions of time and temperature in the presence of critical amounts of an inert alkyl aromatic hydrocarbon diluent.

These and other objects of the invention will become apparent from the ensuing description.

In accordance with this invention, it has now been found that an improved process for preparing rubber-modified polystyrene can be achieved, together with advantages in the control of the polymerization and in the control, uniformity, and quality of the resin product obtained, by carrying out the polymerization under carefully controlled, and critical temperatures in a controlled time-temperature relationship using at the same time a limited amount of an inert alkyl aromatic hydrocarbon diluent in the reaction mixture, the inert diluent being preferably present in one embodiment of this invention from the initiation of the polymerization and at all times thereafter until the end of the reaction. It has been found that an alkyl aromatic diluent, having preferably one alkyl group containing two carbon atoms or more which is liquid at ambient temperatures is the most satisfactory type of inert diluent. It is further preferred that the inert diluent have a boiling point above about 110° C., and preferably about 130° C. to 200° C. Examples of diluents useful herein are ethylbenzene, diethylbenzene, methyl ethylbenzenes and the xylenes, with ethylbenzene being especially preferred. Reference will be made hereinafter to ethylbenzene as the preferred diluent.

The process of this invention can be briefly described as comprising the following major steps. The reaction ingredients, including ethylbenzene, styrene, rubbery materials and additives are mixed in one or more vessels where dissolution of the rubbery materials is accomplished. Subsequently, the mixture is heated in an agitated vessel or several vessels and polymerization (also referred to as the "prepolymerization") is carried to a certain point by catalytic or thermal initiation. In this agitated, or first polymerization step, the rubbery material is also precipitated and assumes certain critical properties. In the following or second polymerization process step, the partially polymerized mixture is further polymerized without vigorous agitation (also referred to as "static polymerization"). The absence of agitation in this second polymerization step does not exclude the use of energy input to cause the movement of the polymerizing mixture. In the second or non-agitated process step, polymerization is carried practically to completion. The mixture of the polymerized material and diluent (ethylbenzene) is subjected to conditions in subsequent process steps where the diluent and any unreacted or volatile components are removed. Finally, the devolatilized polymer melt is extruded or converted to its final physical forms by any other means.

While the basic process steps have been described above, it should be understood that such process steps can be carried out continuously or in batchwise fashion, or any of the above steps or combination of the above steps can be carried out continuously, while the remaining steps can be carried out in batchwise fashion.

The use of ethylbenzene as a diluent in the process of this invention enables the process to be carried out with excellent control of reaction temperatures, ease of heat removal, ease in handling both prepolymer and final polymeric mixtures, so that products of excellent color and physical and chemical properties are obtained. An unexpected benefit arising out of the use of ethylbenzene (although denoted herein as an inert diluent) is its ability to act to a minor but important extent as a chain regulator (chain regulators are frequently referred to as "chain transfer agents"), so that additional known chain regulators can be substituted at least in part by this diluent. The ethylbenzene diluent can be introduced as stated hereinbefore initially with the styrene and rubbery component, or just after the prepolymerization step so that specific advantages can be derived from its use in the second or polymerization step where the mixture is polymerized to substantial completion.

The amount of the inert diluent to be employed ranges from 3 to 30 weight percent based on the total weight of the reaction mixture. For the most preferred conditions, not less than about 5% (preferable for low rubber content formulations, e.g., medium impact polystyrenes) and not more than about 25% (preferable for high rubber content formulations, e.g., masterbatch concentrates) is used. If less than about 3 to 5% by weight is added, then there is little improvement resulting from the addition thereof. There have been some indications that at the higher concentrations of ethylbenzene, for example 40% or more, somewhat poorer properties of impact and melt flow are obtained than at the lower concentrations of about 5 to 25% by weight, based on the total weight of the reaction mixture, excluding the weight of the ethylbenzene.

If inert diluents of substantially higher volatility than the preferred diluents are employed, they do not achieve the good results of the particular diluents described above. The former are too volatile, have reduced solvent power for the initial reactants, particularly the rubbery materials, and may adversely affect the pressure requirements of the reaction requiring, therefore, more expensive high pressure equipment. Also, their presence in the final products aggravates the "blushing" problem. High boiling materials generally also exhibit reduced solubility characteristics and may actually add to the viscosity problems of the reaction mixture.

In carrying out the process, a polymerizable mixture of from about 65 to 98 percent by weight of the vinyl aromatic component, from about 2 to 30 percent by weight of the rubbery material selected as the second component, excluding the diluent, and an amount of ethylbenzene which comprises from about 3 to 30 percent of the total weight of the polymerizable reaction mixture are mixed together to form a solution (the polymerizable mixture can also contain up to 5 percent of additives, in which case the amount of styrene present, for example, will range from 70 to 98 percent by weight). If necessary, a small amount of heat can be applied at this time to enhance complete solution of the ingredients. Some or all of the additives to be included can then be added to this mixture. These can include chain regulators, initiators, lubricants, antioxidants or other stabilizers and any other materials which may be known in the art as useful in such polymerization reactions to improve the properties of the final product. Polymerization is initiated by heating the mixture with proper agitation to from 60° to 140° C., preferably in a separate vessel or vessels (prepolymerizer(s)) from that in which the polymerization is completed to higher levels. For the mixtures contemplated by the process of this invention, temperatures of at least 60° C., where peroxide initiation is used, or about 100° C. where thermal initiation is used, should be attained in the prepolymerizer. A critical amount of polymerization takes place in this step, and preferably a conversion level of the monomer or monomers present to polymer of between about 10 to 45%. Agitation by stirring should be provided in the prepolymerizer and some type of cooling is necessary, since the polymerization is an exothermic reaction and in its absence, hot spots and runaway temperatures may develop. Uncontrolled temperatures at this stage of the process may cause the formation of product with undesirable molecular weight distribution and/or undesirable gel structure, such as crosslinked materials.

The prepolymerized mixture is next passed to a second polymerizer in which the polymerization is substantially completed. In this second polymerizer, temperatures are increased stepwise or in a continuous fashion to as high as 220° C. and they are controlled critically. It is important to carry the polymerization to as near completion as possible, preferably to about 85 and up to 100% conversions of the polymerizable materials added or present. The second polymerization vessel (or vessels) is provided with more or less conventional but elaborate heat transfer equipment to control the internal temperatures. If desired, further polymerization stages can also be employed.

When the reaction has reached the desired stage of completion, the mixture is subjected to a devolatilization step to remove the ethylbenzene and any other volatiles present, including possibly unreacted styrene or other vinyl aromatic compounds. The hot polymer is then subjected to an extrusion or other finishing step to produce the final resin product.

The foregoing steps can be carried out in batchwise fashion or continuously by appropriate arrangement of the various process units as indicated in the attached drawing. The initial steps of the process, that is, up to the static polymerization step can be carried out in batchwise fashion, however, where, as indicated, the initial steps up to the static polymerization are carried out batchwise, the remaining steps which in one embodiment of this invention include heat exchange, devolatilization ("vaporization" in the drawing) and phase separation, can be carried out continuously.

Experimental evidence indicates that for particular reacting mixtures, i.e. a selected weight percent of the polymerizable monovinyl aromatic compound, the rubber reactant, the diluent, and the various additives, which are introduced into the polymerization system at or near the initiation of the reaction and for particular prepolymerization conditions, that there are certain critical time-temperature cycles which yield the most optimum properties in the resin, and hence, the most satisfactory polymerization. One such set of critical conditions for the second step polymerization reaction, for example, has been found to be an approximate 8 to 18 hour temperature cycle (thermal polymerization), which consists of 2 to 7 hours at a temperature above 100° C. and preferably from 115° to 140° C., followed by a gradual increase to a terminal temperature at the end of the 8 to 18 hour period of about 150° to 220° C. After the initial heating period, but prior to completion of the reaction, it is preferred that the temperature of the mixture should not be allowed to drop and be kept for any substantial period of time below about 110° C. in order to avoid the formation of polymer with undesirable molecular weight distribution.

It has been found, for example, that relatively small variations of the temperature levels used throughout the polymerization cycle, such as a deviation of 10° to 20° C. from the critical time-temperature cycle, appreciably influences the properties of the final resin product, including the impact strength.

In a more preferred embodiment of this invention, the solution consisting of monomer, ethylbenzene and rubbery material and other additives is heated in the agitated prepolymerizer reactor to a temperature level of preferably between 110° to 130° C. if thermal initiation is used, or 80° to 120° C. if peroxide initiation is used. In this last case, the temperature range can vary within the limits depending on the particular initiator selected. In either case, polymerization is carried out under carefully controlled temperature and agitation conditions in such manner that a conversion of about between 3 to 15% per hour is obtained and to an extent of about 10 to 45% conversion of the initial monomer or monomers to polymer. [The prepolymer mix is thereafter transferred continuously or in a batchwise fashion to a non-agitated polymerizer reactor or reactors. In this section, the mix is exposed to a temperature cycle such as 3 to 6 hours at between 120° to 140° C., followed by a gradual increase to 150° to 200° C. if thermal initiation is used, or a temperature cycle such as 2 to 6 hours at a temperature level consistent with the particular initiator selected, followed by an increase to between 150° to 200° C. The total cycle in the non-agitated section should be between 8 to 18 hours when thermal initiation is used and from 5 to 12 hours if peroxide initiation is used. The above time values refer to a batch process or refer to an average hold-up for a continuous process. The completed polymer and solvent mix is subsequently transferred to a heat exchange system (heat exchanger, devolatilizer and phase separator) where it is heated in a batch or continuous fashion to temperature levels of between 140° to 260° C. and pressures of between from 760, preferably 360 to 5 millimeters Hg abs. are applied. These conditions will effect vaporization (devolatilization) of the diluent, of the unreacted monomer or monomers and any other volatile material, the presence of which would be detrimental in the finished product. The vapors are collected in a separate system and can be subsequently recovered for further use. The devolatilized polymer melt can be pumped directly to a die head or melt fed into an extruder or other apparatus which is capable of converting the melt to a suitable form.

The monovinyl aromatic compounds which can be employed in producing the rubber-modified polymers herein include monovinyl aromatic compounds having the vinyl radical, or the ethylenically unsaturated radical, attached directly to a carbon atom of the aromatic nucleus. Styrene is the preferred monovinyl aromatic compound employed in this process. Examples of other compounds applicable herein which are alkyl and/or halogen derivatives of styrene are the methyl styrenes, ethyl styrenes, isopropyl styrenes, butyl styrenes, both mono and dialkyl forms, etc., the chloro- and dichlorostyrenes, as well as mono- and dibromostyrenes, and alkyl halostyrenes, or mixtures of these compounds with styrene or with each other. Alpha-methyl styrene is preferably substituted in minor amounts for styrene in the process of this invention. In the broad aspect of this invention, the vinyl aromatic component comprises from about 70 to 98% by weight of the polymerizable mixture and in the more preferred aspects, it comprises from about 85 to 95% excluding the diluent used.

A large variety of unvulcanized natural or synthetic rubbery materials can be used as the second polyerizable component in the polymerization process. The rubbery starting material can be crude natural rubber, crepe rubber, gutta-percha, or synthetic rubbers, such as the SBR type rubbers, which are rubbery copolymers of styrene and butadiene, which may have from 40 to 80% by weight of butadiene and from 60 to 20% of styrene, synthetic nitrile type rubbers containing from 65 to 82% by weight of butadiene and from 35 to 18% acrylonitrile, rubbery homopolymers of butadiene and of isoprene, such as the linear type polymers of a high or low cis-1,4 content, e.g. 30 to 98%, and including the non-linear types prepared in one instance by emulsion or solution polymerization techniques, and the rubbery polymers of isobutylene combined with butadiene or isoprene.

The foregoing rubbery materials usually have a molecular weight of about 15,000 and higher, and broadly particular rubbers may be incorporated into the reactant mixture in amounts from about 2 to 30 weight percent, based on the total weight of reaction mixture excluding solvent, and more preferably the rubbery component is used in amounts of from about 5 to 15 weight percent. The use of from about 3 to 8% of the rubber component yields a medium to high impact polystyrene resin, while the use of from about 10 to 15% of rubber yields a masterbatch concentrate useful in extending general purpose or non-rubber modified polystyrene.

In accordance with another feature of this invention, it has been found useful to add one or more chain regulators to the polymerization system, one such regulator can actually be the diluent used. When this is done, the chain regulator is preferably incorporated into the prepolymerization feed mixture or into the prepolymer mixture during the agitated prepolymerization step. Various aliphatic or aromatic mercaptans can be used as the chain regulators in addition to the diluent used. Examples of these include tertiary dodecyl mercaptan, lauroyl mercaptan, nonyl mercaptan, decyl mercaptan, and other alkyl mercaptans having alkyl radicals of from 6, preferably 8, to 24 carbon atoms or a mixture of the above or higher mercaptans. Similarly, aryl mercaptans are also useful as chain regulators in the reaction. The alkyl mercaptans having ten or more carbon atoms are preferred. These chain regulators are used in amounts of from about 0.01 up to a maximum amount of 0.3 weight percent excluding the weight of the diluent, or alternately, the mercaptan type chain regulator can be substituted at least in part by employment of appropriate amounts of ethylbenzene. Thus, where the lower amounts of mercaptan are used, then the amount of ethylbenzene can be increased in order to control molecular weight, or where substantial elimination of the mercaptan is desired, then the amount of ethylbenzene can be increased to from about 15 to 30 percent by weight as hereinbefore defined. It has been found desirable to use the mercaptan chain regulator in as low a concentration as possible, since higher concentration of these materials may adversely affect the impact strength and surface hardness of the resin product, although, generally, increased amounts of chain regulator give increased melt flow values. The preferred concentration of the chain regulator is from about 0.02 to 0.15 weight percent based on the polymerizable mixture excluding the diluent, depending on the type of resin desired. There are also some effects noticeable in the polymerization process and in the resin product, depending upon the point at which the chain regulator is added during the reaction period. It can be added all at once at the beginning of the prepolymerization stage, or it can be added in increments or portions during the prepolymerization. As another alternative, the chain regulator can be added only after a certain temperature has been reached. It has been found, for instance, that advantages in properties of the finished product are achieved if the chain regulator or first increment thereof is added after the temperature of the mixture has reached at least 80° to 100° C. Two or more of the mercaptans can be used in the form of a mixture as the chain regulators, if desired.

The process of this invention also contemplates the addition of alpha-methyl styrene dimers as chain regulators in amounts up to about one percent.

It has also been found advantageous to incorporate a small amount up to about 5 weight percent and preferably from about 1.5 to 3 weight percent based on the reaction mixture, excluding diluent, of a material which can function as a lubricant. Small amounts of lubricants, such as paraffin wax or a paraffin mineral oil, improve tensile strength and elongation. Other lubricants which can be used are esters or metal salts of saturated higher fatty acids, for example those containing from 16 or more carbon atoms in the alkyl radical of the acid, such as butyl palmitate, butyl stearate, amyl palmitate, amyl stearate, and hexyl stearate. It is preferred that these materials contain no unsaturation and hence be inert in the polymerization reaction. Another of their functions is to facilitate the withdrawal from the molds of articles made from the polymers.

Suitable antioxidants can also be added in amounts of from about 0.2 to 2% by weight, and more preferably in an amount of from about 0.3 to 1% by weight. Examples of antioxidants are trisnonylphenyl phosphite and other phenolic type materials such as butylated hydroxytoluene.

It is possible to carry out the process of this invention using no peroxide initiators, and preferably no initiator(s) is added to the polymerization system. However, a relatively small amount, i.e. about .02 to 0.5, and up to a maximum of 1.0% based upon the monomeric material of a free-radical generating type compound such as, for example, an organic peroxide compound, can be used if desired. Suitable peroxide type initiators include benzoyl peroxide, lauroyl peroxide, t-butyl peroxide, t-butyl peroxybenzoate, t-butyl hydroperoxide, acetyl peroxide, diethylperoxydicarbonate, cumene hydroperoxide and cumyl peroxide.

In a more specific embodiment of the process of this invention, about 80 to 95% by weight of styrene and about 5 to 15% by weight, excluding the diluent, of a natural rubber or synthetic butadiene-styrene copolymer rubber or polybutadiene rubber are added to a dissolving tank together with about 10 up to 15% by weight, based on the total reactants, of ethylbenzene. Stirring is used to cause these materials to form a solution. The resulting solution is then transferred to a second vessel and additives incorporated therein. These additives include from about 1.5 to 3 weight percent of an inert paraffin oil, about 0.3 to 1 weight percent of an antioxidant such as trisnonylphenyl phosphite, and from about 0.02 to 0.08% of t-dodecyl mercaptan.

The mixture is next transferred to a prepolymizer provided with agitation having a high shear type of stirring device. Also, some means for both supplying and removal of heat should be provided in the prepolymerization vessel by means of a circulating heat exchange fluid. A rapid, but controlled rate of heat up is desirable, but reactor temperatures should preferably not be allowed to rise above about 130° C. in this reactor, and preferably should not fall below 100° C. after start of the reaction and heating to that temperature. The charge is held in the prepolymerizer until about 15 to 40% conversion of the monomer to polymer. The resulting reaction product is transferred to a second polymerization vessel where polymerization is substantially completed in bulk. An intermediate filter step can be employed if desired.

The non-agitated polymerizer (or polymerizers) is equipped with means of heat removal and heat supply of high capacity. The temperature is controlled as set forth hereinabove and in line with a specific time-temperature cycle if polymerization is performed in batch operation or alternately a series of reactors are used in continuous operation with temperature levels set such as to expose the polymer mix to the above time-temperature cycle.

It is preferred to rigorously exclude air during both the prepolymerization and the polymerization steps, and indeed, at any time when the polymer is in the dissolved and/or molten state. Such exposure to air tends to cause formation of products containing weak linkages which are unstable and result in undesirable properties, including odor and discoloration. The exclusion of air is accomplished by replacing it with an inert gas and by inert gas blanketing or purging of all process units. Both these polymerization steps are carried out at approximately atmospheric pressure, or they may be carried out at superatmospheric pressures. At any rate, the polymerization is suitably carried out under a pressure sufficient to prevent loss of monomers, the ethylbenzene or any of the other materials by vaporization from the polymerizing mixture at the reaction temperatures.

Following completion of the polymerization, the mixture may be passed into a hold or surge tank if desired, or it is immediately transferred to a heat exchange and devolatilizer system. This system consists of a heat exchanger (optional) where the melt temperature is raised to between 140° to 260° C., preferably between 190° and 230° C., followed by a vaporization (devolatilization) zone, where the low boiling components volatilize, and subsequently to a suitable vessel for the separation of vapors (phase separator) from the polymer melt. Devolatilization can be improved by the use of lower than atmospheric pressures, such as 5 to 150 mm. Hg abs. if desired. The unreacted monomeric material, e.g. styrene, and ethylbenzene recovered from the devolatilization can be recycled either to the dissolver or to the prepolymerization reactor. If necessary, these materials can be purified by conventional techniques prior to recycling.

The specifications for the rubber-modified polystyrene prepared by the process of this invention include typical Izod impact values (ft. lbs. per inch of notch) in the 1.5 to 3.0 range. The melt flow can range between 1.0 to 15 and the maximum volatiles up to 1.5%, but typically less than 0.8% including residual monomer content of less than 0.1%, typical tensile elongation ranges between 20 to 50%.

In the illustrative examples presented hereinbelow, measurements of physical properties of the polymers were made according to standard ASTM procedures or modifications of such where indicated. Izod impact was determined according to ASTM D-256-56; melt flow according to ASTM D-1238-57T (instrument conditions: 190° C. and a load of 5,000 grams); heat deflection according to ASTM D-648-56 and Rockwell Hardness L scale ASTM D-785. Samples were conditioned according to ASTM D-618-58.

The percent volatile content of samples tested and reported herein is a measure of the volatile loss from a polymeric material when subjected to prescribed conditions of time and temperature. The apparatus consists of a Brabender Moisture Tester and Balance and the procedure involves weighing a given quantity (grams) of pulverized sample and heating to 140° C. for 40 minutes and then determining the percent volatiles.

The tensile elongation as reported herein measures the ultimate elongation of molded plastic materials using the gage length dial on an Instron Tensile Tester as an indication of extension up to the point of failure. Test specimens were prepared according to ASTM D-638.

*Example 1*

Referring more particularly to the accompanying drawing which illustrates a process block flow diagram for carrying out the process of this invention, as a typical working embodiment of the process (Run F-2, Table VI below) using ethylbenzene as a diluent, 300 pounds of commercial grade styrene was added to the dissolver tank from the styrene storage and 28 pounds of an SBR type rubber was cut to approximately 1 inch cubes and weighed into the dissolver tank. Agitation was commenced and pressure was reduced to 28 inches Hg gage for a period of approximately 16 hours. At this point, the dissolver was pressurized with dry nitrogen gas and the contents transferred to the agitated prepolymerizer. In a separate container (ethylbenzene and additives) the following solution was prepared: 10.5 pounds of lubricant and 1.75 pounds of trisnonylphenyl phosphite antioxidant were dissolved in 38.9 pounds of ethylbene. This was added as indicated below.

In another container, a solution consisting of 32 grams of t-dodecyl mercaptan dissolved in 10 pounds of commercial styrene was prepared. The contents of this second container were added to the prepolymerizer and agitation was commenced in the prepolymerizer and heated by means of an external heat exchange liquid. The contents of the prepolymerizer reached 120° C. temperature in approximately two hours time. This temperature was maintained during the next two hour period by means of the heat exchange fluid, during which period samples were taken at one half hour intervals for solids content determination in order to enable correlation of monomer conversion. At the end of the two hour period, the contents of the first container (ethylbenzene and additives) were charged to the prepolymerizer while continuing agitation. This addition decreased the temperature to approximately 115° C., which was subsequently increased to the original 120° C. level. Approximately 1½ hours after this addition, the solids content reached about 36%. At this point, the agitated prepolymerization was terminated by transferring the reaction mass to the static polymerizer reactor. In this reactor, the temperature of the reacting polymer mixture was gradually increased from 120° C. to 180° C. in a 15 hour period. At this point, the polymer mass was transferred to the devolatilizer section (heat exchanger and vaporizer) by means of a pump. Temperature of the heat exchange fluid in the heat exchanger and devolatilizer was adjusted such that the polymer mix reached a temperature of approximately 210° to 220° C. when entering the phase separator. Devolatilization of the batch took place in about a 3 hour time span. A pressure of approximately 25 mm. Hg abs. was kept in the phase separating vessel and the vapors were removed and collected in a water cooled condenser and received in a storage tank. At the end of the devolatilization operation, pressure in the phase separating tank was returned to near atmospheric with the use of dry nitrogen gas. The devolatilized polymer was subsequently removed from the phase separator tank by means of a pump and forced to small diameter orifices in order to form molten strands. The strands were cooled in a water trough and cut to short segments with the aid of a pelletizer machine. The finished polymer thus removed was collected and weighed, totaling 275 pounds, the condensate weighed 45 pounds and the balance of original weight was recovered in the form of various samples taken throughout the polymerization.

The illustrative examples to be presented below also include a comparison of this process with that wherein no diluent was included during the various processing steps described above. In this case, the process was carried out in a similar fashion as described above, except that no diluent was added at any point to the system and after completing the total polymerization cycle in the static polymerizer reactor, the polymer melt was directly transferred to the strand die. Thus, the devolatilization section shown in the attached diagram was bypassed as indicated by the dashed line in the block flow diagram.

As discussed previously herein, it is not necessary that the diluent be added initially to the prepolymerizer, since modifications as discussed above include the addition of diluent to the dissolver or to the agitated polymerizer before heating up the reaction mix or at any point during the prepolymerization and after the prepolymerization cycle, but prior to the static polymerizer. Similarly, for reasons of changing physical properties of the finished product, it might be desirable to add any or all of the additives including the chain regulator at various points in the dissolver into the prepolymerizer before heat-up or during heat-up, or at various points during or after the prepolymerization step, but prior to the static polymerization cycle. Furthermore, it might be desirable, for the above reasons, to use an incremental addition of the solvent or that of the additives including the chain regulator, as described above.

*Example 2*

Following the procedure set forth in Example 1 above, a series of runs were carried out under varying conditions and these are reported in the tables below. In each of the runs presented, the amount of lubricant as well as the chain regulator was varied in accordance with the preferred ranges set forth above in order to obtain resins with property variations such as melt flow, surface hardness, elongation, etc.

TABLE I

| Run Series | Diluent, Percent | When added | Rubber, Percent | Rubber Type | Lubricant 1/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| A-1 | 0 | | 3 | SBR | 3.0/0 | 3.0 | 0.25 | 7.0 | | | 2.6 |
| A-2 | 0 | | 3 | SBR | 3.0/0 | 2.3 | 0.28 | 4.2 | | | 2.0 |
| A-3 | 0 | | 4 | SBR | 3.0/.075 | 13.5–18.0 | 0.38–0.48 | 14.0–23.4 | | | 1.90–2.80 |

See footnotes at end of Table IX.

TABLE II

| Run Series | Diluent, Percent | When added | Rubber, Percent | Rubber Type | Lubricant 1/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| B-1 | 10 | Start | 4 | SBR | 1.5/0.03 | 4.0 | 0.9 | 19.3 | 86 | 82.7 | 0.7 |
| B-2 | 10 | do | 5 | SBR | 2.0/0.03 | 2.4 | 1.7 | 33.0 | | 75.0 | 0.5 |
| B-3 | 10 | do | 6.5 | P 2 | 3.0/0.02 | 3.0 | 1.5 | 24.4 | | 70.6 | |

See footnotes at end of Table IX.

TABLE III

| Run Series | Diluent, Percent | When added | Rubber, Percent | Rubber Type | Lubricant 1/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| C-1 | 10 | Start | 4 | SBR | 2.0/0.03 | 2.3 | 0.9 | 27 | | | 0.8 |
| C-2 | 10 | do | 4 | SBR | 3.0/0.03 | 8.1 | 0.92 | 27.8 | | 78.4 | 0.8 |
| C-3 | 10 | do | 5 | SBR | 3.5/0.05 | 7.2 | 1.1 | 19.7 | | 64.5 | 0.6 |
| C-4 | 10 | do | 5 | SBR | 3.5/0.07 | 13.1 | 0.84 | 35.0 | | 63.3 | |

See footnotes at end of Table IX.

TABLE IV

| Run Series | Diluent, Percent | When added | Rubber, Percent | Rubber Type | Lubricant 1/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| D-1 | 7.6 | During heat-up | 8 | P | 3.0/0.08 | 6.6 | 1.1 | | | | 0.1 |
| D-2 | 15 | Start | 8 | P | 3.0/0.03 | 4.1 | 2.2 | 42.6 | | | 0.3 |
| D-3 | 20 | To Prepolymerizer | 8 | SBR | 3.0/0.02 | 3.2 | 1.7 | 42.2 | | | <0.4 |

See footnotes at end of Table IX.

TABLE V

| Run Series | Diluent, Percent | When added | Rubber, Percent | Rubber Type | Lubricant[1]/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| E-1 | 10 | Start | 8 | P | 3.0/0.02 | 1.8 | 1.6 | 39.8 | | | 0.3 |
| E-2 | 10 | do | 8 | P | 3.0/0.02 | 4.4 | 2.2 | 21.0 | | | 0.5 |

See footnotes at end of Table IX.

TABLE VI

| Run Series | Diluent, Percent | When added | Rubber, Percent | Rubber Type | Lubricant[1]/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| F-1 | 10 | To Prepolymerizer | 8 | SBR | 3.0/0 | 0.9 | 3.12 | | | | 0.8 |
| F-2 | 10 | do | 8 | SBR | 3.0/0.02 | 2.1 | 2.9 | 32.5 | 85.0 | | |
| F-3 | 10 | Start | 8 | P | 3.0/0.02 | 2.8 | 2.7 | 30.8 | 84.0 | | <0.4 |

See footnotes at end of Table IX.

TABLE VII

| Run Series | Diluent, Percent | When added | Rubber, Percent | Rubber Type | Lubricant[1]/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| G-1 | 10 | To Prepolymerizer | 8 | SBR | 3.0/0.04 | 7.1 | 1.93 | 40.3 | | | |
| G-2 | 10 | Start | 8 | P | 3.0/0.04 | 5.4 | 2.1 | 26.9 | | | 0.3 |

See footnotes at end of table IX.

TABLE VIII

| Run Series | Diluent, Percent | When added | Rubber, Percent | Rubber Type | Lubricant[1]/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| H-1 | 10 | During heat-up | 4 | SBR | 0/.03 | 3.1 | 0.9 | 13.4 | 88.5 | 86.4 | |
| H-2 | 15 | Start | 8 | P | 1.0/0.025 | 2.2 | 2.1 | 37.0 | 88.3 | 63.2 | |

See footnotes at end of Table IX.

TABLE IX

| Run Series | Diluent, Percent | When added | Rubber, Percent | Rubber Type | Lubricant[1]/ Chain Regulator | Melt Flow | Izod Impact | Tensile, Elongation | Heat Deflection | Hardness Rockwell L Scale | Total Volatiles, Percent |
|---|---|---|---|---|---|---|---|---|---|---|---|
| I-1 | 20 | Start | 15 | P | 4.5/0.04 | 5.3 | >4.0 | 33.4 | | | |
| I-2 | | | 5 | P [3] | | 8.6 | 0.8 | 25.4 | | 70.0 | |
| I-3 | | | 5 | P [3] | | 1.8 | 1.1 | 21.5 | 86.5 | 80.0 | |
| I-4 | | | 5 | P [3] | | 4.7 | 1.1 | 27.3 | | 77.0 | |
| I-5 | | | 8 | P [3] | | 4.6 | 1.9 | 30.6 | | | |

[1] Lubricant = a paraffin oil or wax; Chain Regulator is t-dodecyl mercaptan.
[2] P indicates Polybutadiene.
[3] From masterbatch concentrate (I-1).

In the various runs presented above, the following can be particularly pointed out. Run Series A shows the operation of the process without the use of diluent in comparison to Series B through I which were carried out in accordance with this invention. Izod impact values were poor (in comparison to equivalent or substantially equivalent runs in the remainder of the series); tensile elongations were poor (tensile elongations of from 20 to 50% are highly desirable as they affect beneficially yield properties under tensile stress); volatile contents were high (not desirable for various reasons) and drainage of the polymer from the static polymerizer was excessively time-consuming (affecting production capacity). Due also to poor drainage, substantially only high melt flow resins can be produced by this technique. Run A-3 represents a large scale run wherein some 20+% of the polymer recovered was not considered prime due to excessive hold-up during drainage and other factors. Physical property measurements on similar samples varied somewhat as indicated in Table I.

Run Series B shows that the process of this invention is capable of producing excellent medium to high impact resins with low SBR and polybutadiene concentrations, while Series C demonstrates that similarly low rubber concentrations can be employed and still produce variations in melt flow. It will be noted that Run C-4 illustrates high melt flow while retaining excellent Izod impact under this critical condition.

Run Series D demonstrates variations in amounts of diluent employed as well as methods of introducing it.

Run Series E demonstrates peroxide initiation (E-1) during prepolymerization (0.1 percent benzoyl peroxide) and peroxide initiation (E-2) during static polymerization (0.17 percent t-butyl peroxybenzoate). All of the runs in Tables I through IX, except E-1 and E-2, were carried out without peroxide initiation.

Run Series F (as well as others) shows use of SBR (copolymer comprised of approximately 75 percent butadiene and 25 percent styrene) and polybutadiene. Note the excellent high impact values. The polybutadiene employed was of the linear type (about 35% cis-1,4 content) prepared by well known Ziegler type catalysts. Other polybutadienes as hereinbefore indicated can also be used satisfactorily.

Run Series G shows production of high impact resins (note also Run F-1) with excellent melt flow, while Series H demonstrates the production of a high heat resistant material as measured by heat deflection temperature using 4 and 8 percent rubber in the formulations and resulting in medium and high impact properties.

Run I–1 shows a masterbatch preparation of high impact material (Izod impact too high to measure) by the process of this invention.

In Run Series I–2 through I–5 blends were prepared using the masterbatch concentrate of I–1 and general purpose polystyrenes of various grades as discussed below and in amounts which resulted in blends containing 5 and 8 percent rubber. These were physically blended in a tumbler and subsequently homogenized by extrusion. Run I–2 is a blend of easy flow polystyrene and masterbatch to produce a medium impact injection molding grade material and Run I–3 is a blend of a heat resistant polystyrene and masterbatch to produce a medium impact heat resistant grade material. Run I–4 is a blend of extrusion grade polystyrene and masterbatch to produce a medium impact extrusion grade product, while Run I–5 is a blend of extrusion grade polystyrene and masterbatch to produce a high impact material.

In the preponderance of the runs, according to the process of this invention, surface hardness of the polymers, as measured on the L scale (Rockwell) was above 60. Usually from 55 to 65 is considered excelent. Volatiles were consistently below 1.5 percent, predominantly below 0.8 percent, including residual monomer content of less than 0.1%.

Outstanding advantages of the process of this invention, in addition to those previously indicated are (a) improved heat transfer due to use of the diluent, and ultimate improved properties (better control of critical time-temperature cycles), (b) improved drainage of the viscous melt from the static polymerizer to downstream processing equipment. Previously, long drainage times were required without the employment of additional inert diluent and this resulted in long hold-up times at critically high temperatures so that the polymer was degraded and only a portion could be considered prime, (c) improved removal of volatiles including unreacted styrene monomer and low molecular weight ends. The volatile ethylbenzene functions as a stripping agent during devolatilization of the polymer melt thereby consistently leading to extremely low volatile contents in the product, which in some applications of such product, e.g. food packaging, is critically important.

Certain process features and product properties arising out of the employment of polybutadiene of the linear variety in the process herein are described and claimed in S.N. 302,458 filed 8/15/63.

Although the process of this invention has been specifically described with reference to preferred embodiments herein, modifications can be made falling within the spirit of this invention and the scope of the appended claims.

What is claimed is:

1. A bulk polymerization process for the preparation of a diolefin rubber-modified polyvinyl aromatic product which comprises the following sequential steps:
    (a) polymerizing with agitation in an initial polymerization zone, a polymerizable mixture comprising about 70 to 97 percent by weight of a polymerizable composition and about 3 to 30 perecnt by weight of an inert alkyl aromatic diluent having a boiling point between about 110° C. to 200° C., said polymerizable composition comprising about 70 to 98 percent by weight of a polymerizable compound selected from the group consisting of styrene, alkyl derivatives of styrene, halogen derivatives of styrene and mixtures thereof, about 2 to 30 percent by weight of a diolefin rubber, at an elevated temperature below about 140° C. until a conversion of about 10 to 45 percent polymeric material is obtained;
    (b) passing the resulting initial reaction product mixture, comprising partially polymerized and unreacted materials, to at least one additional polymerization zone wherein said reaction product mixture is further subjected to polymerization at a temperature above 100° C. and up to 220° C. until a conversion of from 85 to 100 percent is obtained;
    (c) passing the resulting polyvinyl aromatic product to a devolatilization zone wherein said product is heated to a temperature of about 140° to 260° C. and under a pressure of about 5 mm. to 760 mm. Hg abs. to remove unreacted polymerizable compound and alkyl aromatic diluent; and
    (d) recovering said devolatilized polyvinyl aromatic product.

2. The process of claim 1 wherein said vinyl aromatic compound is styrene.

3. The process of claim 1 wherein the alkyl aromatic inert diluent is ethylbenzene.

4. The process of claim 1 carried out continuously.

5. A bulk polymerization process for preparation of a diolefin rubber-modified polystyrene product which comprises the following sequential steps:
    (a) polymerizing with agitation in an initial polymerization zone, a mixture comprising about 70 to 95 percent by weight of a polymerizable composition and about 5 to 30 percent by weight of ethylbenzene, said polymerizable composition comprising about 80 to 95 percent by weight styrene and about 5 to 15 percent by weight diolefin rubber, at a temperature of from about 60° to 140° C. until a conversion of about 10 to 45 percent polymeric material is obtained;
    (b) passing the resulting initial reaction product mixture, comprising partially polymerized and unreacted materials, to a second polymerization zone wherein said initial reaction product mixture is heated at a temperature of from about 115° to 200° C., and for a period of about 8 to 18 hours, to obtain a polystyrene product having a polymerized content of about 85 to 100 percent;
    (c) passing said polystyrene product to a devolatilization zone wherein said product is heated to a temperature of about 140° to 260° C. at a pressure of about 5 to 760 mm. Hg abs. to remove unreacted styrene and ethylbenzene; and
    (d) recovering said devolatilized polystyrene product.

6. The process of claim 5 wherein the diolefin rubber-modified polystyrene product after step (b) is continuously introduced to the devolatilization zone and continuously from this zone to a phase separation zone wherein unreacted styrene and ethylbenzene are continuously removed from said product.

7. The process of claim 5 wherein said diolefin rubber is a copolymer of styrene and butadiene.

8. The process of claim 5 wherein said polymerizable composition contains minor amounts of a lubricant, an antioxidant, and a chain transfer agent.

9. The process of claim 5 wherein said initial and second polymerization steps are carried out under an inert atmosphere.

10. The process of claim 5 wherein the unreacted styrene and ethylbenzene recovered from the devolatilization step are recycled to the initial polymerization step.

11. The process of claim 5 wherein said polymerization step (b) comprises heating the initial reaction product mixture at temperatures within the range of about 110° to 135° C. for about 2 to 7 hours and then gradually increasing the temperature to about 200° C. for a total time period of about 8 to 18 hours.

12. A bulk polymerization process for preparation of a diolefin rubber-modified polystyrene which comprises the following sequential steps:
    (a) polymerizing with agitation in an initial polymerization zone, a mixture comprising about 80 to 95 percent by weight of a polymerizable composition and about 5 to 20 percent by weight of ethylbenzene, said polymerizable composition comprising about 80 to 95 percent by weight styrene and about 5 to 15 percent by weight of a diolefin rubber at a temperature of from about 60° to 140° C. until a conversion of about 15 to 45 percent polymeric material is obtained;

(b) passing the resulting initial reaction product mixture, comprising partially polymerized and unreacted materials, to a second polymerization zone wherein said initial reaction product mixture is heated gradually at a temperature of from about 115° to 140° C. for a period of about 2 to 7 hours followed by a gradual increase to a terminal temperature of 150° to 210° C. for a total period of about 8 to 18 hours, to obtain a diolefin rubber-modified polystyrene product having a polymerized content of about 85 to about 100 percent, (c) passing said diolefin rubber-modified polystyrene product to a devolatilization zone wherein said product is heated to a temperature of about 140° to 240° C. at a pressure of about 5 to 360 mm. Hg abs. to remove unreacted styrene and ethylbenzene; and (d) recycling said unreacted styrene and ethylbenzene to step (a) above.

13. The process of claim 12 wherein the ethylbenzene is added to the polymerizable composition at a point prior to polymerization step (b).

14. The process of claim 12 wherein there is recovered from step (c) a diolefin rubber-modified polystyrene containing from about 10 to 15 percent by weight of said rubber.

References Cited by the Examiner
UNITED STATES PATENTS 3,243,481   3/1966   Ruffing  ------------ 260—880

MURRAY TILLMAN, *Primary Examiner.*

DAVID J. BREZNER, *Assistant Examiner.*